US007513102B2

(12) United States Patent
Moniz et al.

(10) Patent No.: US 7,513,102 B2
(45) Date of Patent: Apr. 7, 2009

(54) INTEGRATED COUNTERROTATING TURBOFAN

(75) Inventors: Thomas Ory Moniz, Loveland, OH (US); Scott Michael Carson, Mason, OH (US); Robert Joseph Orlando, West Chester, OH (US); Ching-Pang Lee, Cincinnati, OH (US); David Glenn Cherry, Loveland, OH (US)

(73) Assignee: General Electric Company, Schenectady, NY (US)

( * ) Notice: Subject to any disclaimer, the term of this patent is extended or adjusted under 35 U.S.C. 154(b) by 569 days.

(21) Appl. No.: 11/145,875

(22) Filed: Jun. 6, 2005

(65) Prior Publication Data
US 2006/0272314 A1 Dec. 7, 2006

(51) Int. Cl.
*F02K 3/00* (2006.01)
*F02K 3/02* (2006.01)
*F02C 1/06* (2006.01)
(52) U.S. Cl. ............. 60/268; 60/226.1; 60/39.162
(58) Field of Classification Search ............. 60/39.162, 60/226.2, 226.3, 262, 268; 415/202, 242
See application file for complete search history.

(56) References Cited

U.S. PATENT DOCUMENTS

| 2,662,553 | A | * | 12/1953 | Dimmock ............. 138/37 |
| 2,724,546 | A | | 11/1955 | Barrett et al. |
| 2,766,963 | A | | 10/1956 | Zimmerman |
| 2,931,625 | A | | 4/1960 | Lechthaler et al. |
| 3,635,586 | A | | 1/1972 | Kent et al. |
| 3,807,891 | A | | 4/1974 | McDow et al. |
| 3,823,553 | A | | 7/1974 | Smith |
| 3,854,842 | A | | 12/1974 | Caudill |
| 3,903,690 | A | | 9/1975 | Jones |
| 4,131,387 | A | * | 12/1978 | Kazin et al. ............. 415/119 |
| 4,277,225 | A | | 7/1981 | Dubois et al. |
| 4,543,036 | A | * | 9/1985 | Palmer ............. 415/1 |
| 4,553,901 | A | | 11/1985 | Laurello |
| 4,714,407 | A | * | 12/1987 | Cox et al. ............. 415/192 |
| 4,826,400 | A | * | 5/1989 | Gregory ............. 415/181 |
| 5,131,814 | A | | 7/1992 | Przytulski et al. |
| 5,207,556 | A | | 5/1993 | Frederick et al. |
| 5,307,622 | A | | 5/1994 | Ciokajlo et al. |
| 5,327,716 | A | | 7/1994 | Giffin et al. |
| 5,354,174 | A | | 10/1994 | Balkcum et al. |

(Continued)

OTHER PUBLICATIONS

Sharma et al, "Energy Efficient Engine, Low-Pressure Turbine Subsonic Cascade, Component Development and Integration Program," NASA CR-165592, Jan. 1982, pp. Cover, i, iii-xi, 1-17 and 79.

(Continued)

*Primary Examiner*—Michael Cuff
*Assistant Examiner*—Gerald L Sung
(74) *Attorney, Agent, or Firm*—William S. Andes; Francis L. Conte

(57) ABSTRACT

A turbofan engine includes a fan, compressor, combustor, single-stage high pressure turbine, and low pressure turbine joined in serial flow communication. First stage rotor blades in the low pressure turbine are oriented oppositely to the rotor blades in the high pressure turbine for counterrotation. First stage stator vanes in the low pressure turbine have camber and twist for carrying swirl directly between the rotor blades of the high and low pressure turbines.

24 Claims, 5 Drawing Sheets

U.S. PATENT DOCUMENTS

| | | | |
|---|---|---|---|
| 5,357,744 | A | 10/1994 | Czachor et al. |
| 5,443,590 | A | 8/1995 | Ciokajlo et al. |
| 5,569,018 | A | 10/1996 | Mannava et al. |
| 5,741,117 | A | 4/1998 | Clevenger et al. |
| 5,996,331 | A | 12/1999 | Palmer |
| 6,183,193 | B1 | 2/2001 | Glasspoole et al. |
| 6,353,789 | B1 * | 3/2002 | Hanson ............... 701/100 |
| 6,508,630 | B2 | 1/2003 | Liu et al. |
| 6,684,626 | B1 * | 2/2004 | Orlando et al. ........... 60/268 |
| 6,883,303 | B1 | 4/2005 | Seda et al. |
| 7,258,525 | B2 | 8/2007 | Boeck |
| 2003/0163984 | A1 * | 9/2003 | Seda et al. ............. 60/226.1 |
| 2004/0168443 | A1 | 9/2004 | Moniz et al. |

OTHER PUBLICATIONS

GE Aircraft Engines, "GE/Rolls_Royce JSF F136 Program Details", http:www.geae.com/aboutgeae/presscenter/military/military_20020722g.html, May 31, 2005, 2 pages.

Rolls-Royce, "Trent 900," http://www.rolls-royce.com/civil_aerospace/products/airlines/trent900/technology_flash.jsp, copyright 2004, single page.

Pratt & Whitney, "PW6000," PW6000 http://www.pratt-whitney.com/presskit/images/pw6000_cutaway_high.jpg, website date before, Jun. 1, 2005, single page.

Rolls-Royce, "Trent 900," http://www.rolls-royce.com/civil_aerospace/downloads/airlines/trent_900.pdf, Feb. 2005, single page.

Pratt & Whitney, P & W Energy Efficient Engine, cross section, publicly available in the 1980's, single page.

T. Moniz, U.S. Appl. No. 10/976,495, filed Oct. 29, 2004.

J. Seda et al, U.S. Appl. No. 10/976,523, filed Oct. 29, 2004.

T. Moniz et al, U.S. Appl. No. 10/976,496, filed Oct. 29, 2004.

R. J. orlando et al, U.S. Appl. No. 11/145,837, filed Jun. 6, 2005.

D. G. Cherry et al, U.S. Appl. No. 11/145,848, filed Jun. 6, 2005.

* cited by examiner

INTEGRATED COUNTERROTATING TURBOFAN

BACKGROUND OF THE INVENTION

The present invention relates generally to gas turbine engines, and, more specifically, to aircraft turbofan engines.

Gas turbine engines have evolved into many configurations for powering various forms of commercial and military aircraft. The typical turbofan engine includes in serial flow communication a fan, compressor, combustor, high pressure turbine (HPT), and low pressure turbine (LPT).

Air enters the engine and is pressurized by the fan and compressor and mixed with fuel in the combustor for generating hot combustion gases. Energy is extracted from the combustion gases in the HPT which powers the compressor through an interconnecting shaft. Additional energy is extracted from the combustion gases in the LPT which powers the fan through a second shaft.

The fan is typically disposed inside a fan nacelle that defines a substantially annular bypass duct around the cowl which surrounds the core engine. Air pressurized by the fan blades is split radially with an inner portion being channeled through the compressor of the core engine, and an outer portion being channeled through the bypass duct, and therefore bypassing the core engine. Propulsion thrust is generated by the pressurized fan air bypassing the core engine as well as by the hot combustion gases discharged from the core engine.

Turbofan engines may be low or high bypass depending upon the amount of fan air bypassing the core engine. Modern turbofan aircraft engines powering commercial aircraft in flight are typically high bypass engines with relatively large, single stage fan blades mounted inside the nacelle and powered by a multistage LPT. The HPT may have a single stage or multiple stages therein and cooperates with the multiple stages of the LPT for maximizing energy extraction from the combustion gases to power the fan and compressor.

The compressor in a modern turbofan engine is typically a multistage axial high pressure compressor directly driven by the rotor or shaft of the HPT. And in some configurations, a multistage, axial booster or low pressure compressor is disposed between the fan and high pressure compressor and joined to the fan shaft or rotor powered by the LPT.

The compressors and turbines have various stages or rows of rotor blades extending radially outwardly from supporting rotor spools or disks joined together by the corresponding rotors or shafts. Each stage or row of rotor blades typically cooperates with an upstream row or stage of stator vanes.

Stator vanes and rotor blades have corresponding airfoil configurations which cooperate for pressurizing the air in the compressor and expanding the combustion gases in the turbines for extracting energy therefrom. Each airfoil has a generally concave pressure side and an opposite, generally convex suction side extending radially in span between axially opposite leading and trailing edges.

The nominal curvature of the airfoil is represented by the camber line extending between the leading and trailing edges. And, the concave pressure side and convex suction side are specifically configured for providing the desired pressure distributions thereover for maximizing efficiency of air compression in the compressor and gas expansion in the turbines.

The rotors of the HPT and LPT typically rotate in the same direction, or co-rotate, and the angular or twist orientation of the vanes and blades in the compressor and turbines typically alternate between the airfoil rows as the flow streams are turned in their tortuous path through the engine.

Each vane and blade row has a corresponding total number of airfoils therein required for efficiently turning the flow streams under the aerodynamic loading therefrom. Each row typically has a substantial number or multitude of airfoils around the circumference thereof dictated by the aerodynamic loading requirements of each stage and the turning or swirling of the flow streams axially therethrough.

For example, a single stage high pressure (HP) turbine typically has a substantial amount of exit swirl of the combustion gases, for example about 25 degrees. Correspondingly, the first stage low pressure (LP) turbine nozzle has vanes with substantial curvature or camber for efficiently turning the high swirl discharge flow from the HPT.

In a two stage HPT, the second stage HP blades typically have corresponding camber and angular orientation or twist relative to the axial centerline axis of the engine for effecting nearly zero swirl at the exit of HPT. Correspondingly, the first stage LP nozzle vanes will have suitable camber and twist for efficiently channeling the combustion gases to the first stage LP blades.

Modern turbofan engines presently used for powering commercial aircraft in flight enjoy high operating efficiency due to the many -advancements in design of the various components thereof over many years of development and commercial use in service. Since the engines power aircraft in flight, the size and weight of the engines themselves are ever paramount design objectives along with maximum efficiency of operation. The cost of jet fuel continually increases, and the need to further maximize efficiency of turbofan engines and reduce fuel consumption becomes ever more challenging in modern aircraft engine design.

Accordingly, it is desired to provide a turbofan aircraft engine having further improvement in efficiency in the turbine stages thereof.

BRIEF DESCRIPTION OF THE INVENTION

A turbofan engine includes a fan, compressor, combustor, single-stage high pressure turbine, and low pressure turbine joined in serial flow communication. First stage rotor blades in the low pressure turbine are oriented oppositely to the rotor blades in the high pressure turbine for counterrotation. First stage stator vanes in the low pressure turbine have camber and twist for carrying swirl directly between the rotor blades of the high and low pressure turbines.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
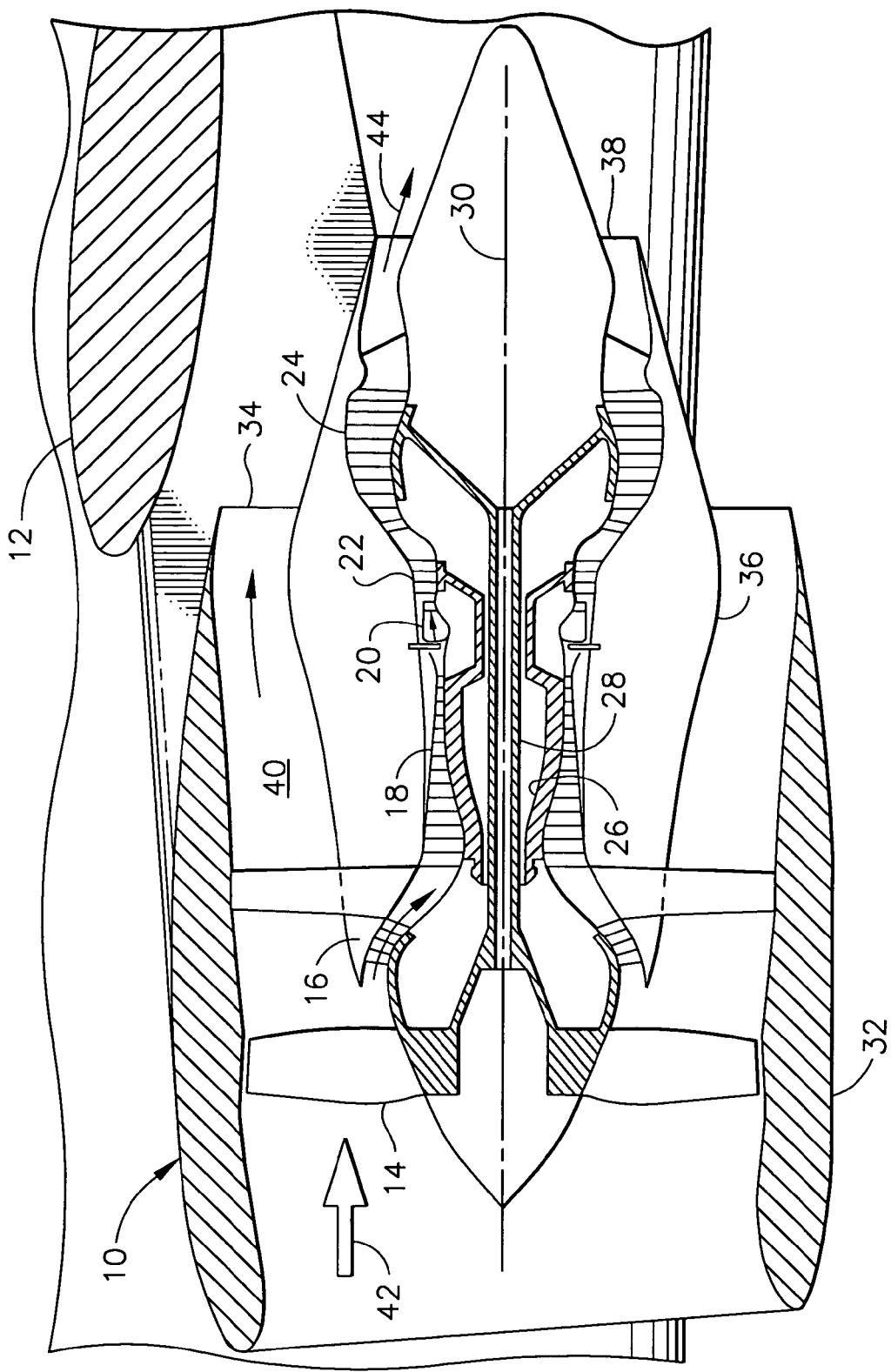
FIG. 1 is a partly sectional axial view of aircraft turbofan gas turbine engine mounted to the wing of aircraft.

Illustrated schematically in FIG. 1 is a turbofan engine 10 mounted to the wing 12 of aircraft for providing propulsion thrust therefor. The engine includes in serial flow communication a fan 14, low pressure or booster compressor 16, multistage high pressure axial compressor 18, annular combustor 20, high pressure turbine (HPT) 22, and multistage low pressure turbine (LPT) 24.

The high pressure compressor 18 is joined to the HPT 22 by a first shaft or rotor 26, and the fan 14 and booster compressor 16 are joined to the LPT 24 by a second shaft or rotor 28 which are concentric with each other, and coaxial about a longitudinal or axial centerline axis 30 of the engine.

A fan nacelle 32 surrounds the fan 14 and extends aft therefrom to terminate at a distal end in a substantially annular fan outlet or nozzle 34. A core cowl 36 surrounds the compressors 16,18, combustor 20, HPT 22, and LPT 24, and has an annular core outlet or nozzle 38 which is spaced downstream or aft from the fan outlet 34.

The fan nacelle 32 is mounted outside the core cowl 36 by a conventional fan frame extending radially therebetween, with the nacelle and cowl being spaced apart radially to define a substantially annular bypass duct 40 terminating at the fan outlet 34 forward or upstream of the core outlet 38.

The basic turbofan engine 10 illustrated in FIG. 1 is conventional in configuration and operation, except as modified and described hereinbelow. During operation, ambient air 42 enters the inlet of the fan nacelle and is pressurized by the row of fan rotor blades in the fan 14. The air is then split radially in outer part through the bypass duct 40 and in inner part through the low and high pressure compressors 16,18 which further pressurize the air sequentially in turn to the combustor 20. Fuel is added to the pressurized air in the combustor and ignited for generating hot combustion gases 44 from which energy is extracted in the HPT 22 and LPT 24.

The exemplary engine has a high bypass ratio for the pressurized fan air 42 channeled through the bypass duct 40. The single stage fan 14 pressurizes the air for producing a majority of the propulsion thrust for the engine through the fan outlet 34. The inner portion of the fan air is further pressurized in the compressors for generating the hot combustion gases which are discharged through the core outlet 38 for providing additional thrust in powering the aircraft in flight.

The engine is axisymmetrical about the axial centerline axis 30 with a full row of fan blades extending radially outwardly from a supporting rotor disk at the forward end of the second rotor 28. The low and high pressure compressors 16,18 include corresponding rows of stator vanes and rotor blades through which the air is sequentially pressurized to the last stage thereof. The rotor blades of the booster compressor 16 are joined to the second shaft 28, whereas the rotor blades of the high pressure compressor 18 are joined to the first rotor 26.

Figure 2:
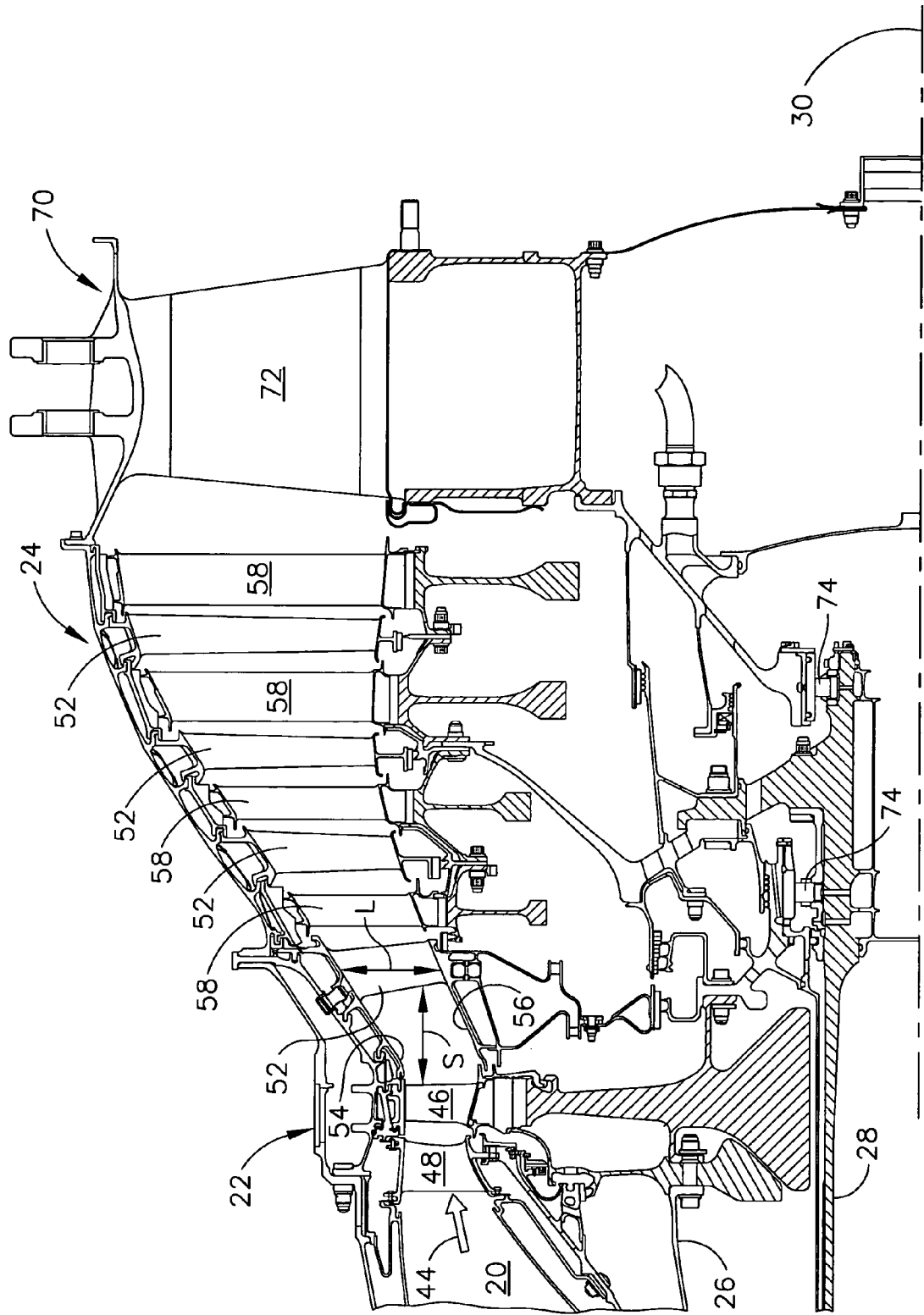
FIG. 2 is an enlarged elevation view of the turbine section of the engine illustrated in FIG. 1.

FIG. 2 illustrates in more detail the turbine section of the engine downstream from the discharge end of the annular combustor 20. The HPT 22 includes a single row or stage only of high pressure (HP) rotor blades 46 extending radially outwardly from a supporting disk which in turn is joined to the first rotor 26. Correspondingly, the HPT 22 also includes a single turbine nozzle having a row of HP stator vanes 48 mounted radially between outer and inner bands.

The blades 46 and vanes 48 of the HPT 22 have airfoil configurations with generally concave pressure sides, and opposite, generally convex suction sides extending axially in chord between opposite leading and trailing edges, and radially in span over the flowpath through which the combustion gases 44 are channeled axially aft in the downstream direction.

Figure 3:
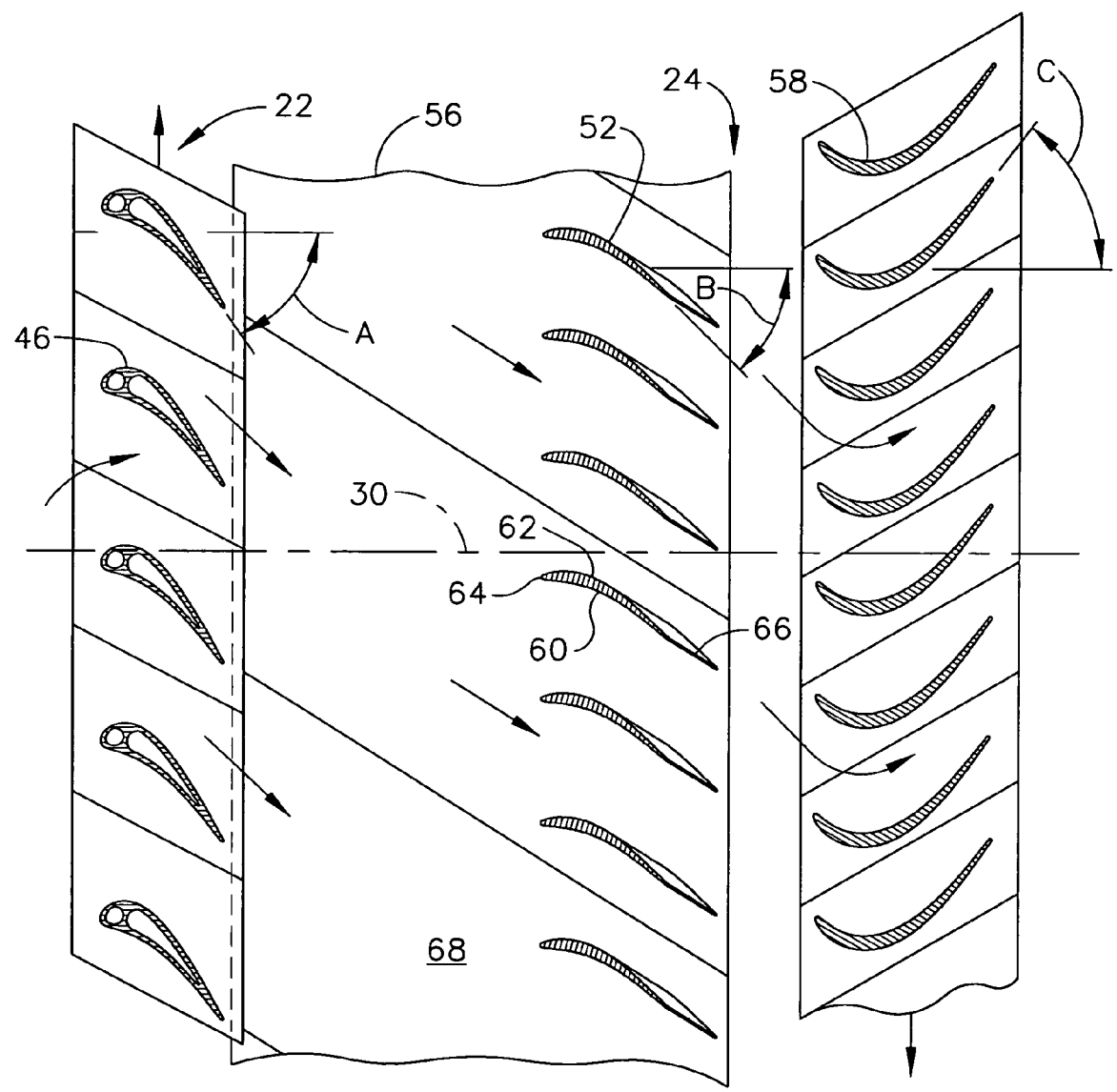
FIG. 3 is a radial view of exemplary airfoils in the turbines illustrated in FIG. 2 and taken along line 3-3.

As shown in FIG. 3, the single-stage HP blades 46 have arcuate camber and an angular orientation represented by an acute first twist angle A relative to the axial axis 30 for effecting a corresponding, non-zero or acute angle exist swirl in the combustion gases 44 discharged therefrom during operation. FIG. 3 illustrates the physical twist angle A which may be measured on the suction side of the blade at its trailing edge, or may be relative to the mean camber line extending through the center of the blade.

The row of HP blades 46 illustrated in FIG. 3 rotates in a first direction which is clockwise aft-looking-forward in the engine and will discharge the combustion gases with an absolute swirl angle which is non-zero and about 25 degrees in one example. This large exit swirl must be suitably channeled in the downstream stages for minimizing undesirable pressure losses.

The LPT 24 is illustrated schematically in FIG. 1 and includes four stages in the exemplary embodiment, which cooperate with the single stage HPT 22. FIG. 2 illustrates in more detail the four stages of the LPT 24 which typically increase in size and radial elevation in the downstream direction.

The LPT 24 includes a first stage low pressure (LP) turbine nozzle 50 directly following the HP blades 46 in flow communication therewith in a direct integration therewith without any intervening midframe struts or fairings therebetween. The first stage LP nozzle 50 includes a row of first stage LP stator vanes 52 extending radially in span between annular outer and inner bands 54,56. The first stage LP nozzle 50 is followed directly in turn by a row of first stage LP rotor blades 58 fixedly joined to the second rotor 28 illustrated in FIG. 1.

Since the LPT 24 illustrated in FIG. 2 includes four exemplary stages, each stage includes a corresponding stator nozzle having vanes 52 extending radially between outer and inner bands suitably supported inside a surrounding casing of the engine. The vanes 52 typically increase in radial span from stage to stage in the downstream direction.

Following each nozzle stage in the LPT is a corresponding row of rotor blades 58 also typically increasing in radial size in the downstream direction. Each row of blades 58 typically extends radially outwardly from a supporting rotor disk with the four disks of the four stages being suitably joined together, and further joined to the common second rotor 28 for powering the fan 14 during operation.

As shown in FIG. 3, the LP rotor blades 58 are oriented oppositely to the HP rotor blades 46 for counterrotating the first and second rotors 26,28 to which they are joined. Counterrotation of the rotors in the HPT 22 and LPT 24 permits a substantial increase in aerodynamic efficiency of the LPT itself as well as in the HPT which contribute to increasing the overall efficiency of the counterrotating turbofan aircraft engine illustrated in FIG. 1.

The swirl or angular flow direction of the combustion gases through the different stages of the turbines is effected by the corresponding angular orientation, profiles, and camber of the various airfoils in the flowpath of the combustion gases downstream from the combustor. Swirl is also affected by the velocity or Mach number of the combustion gases as they travel along the flowpath, and is a complex three dimensional flow with axial, tangential, and radial components.

The introduction of counterrotation in the turbines illustrated in FIG. 2 is complemented with the specific configuration and orientation of the first stage LP nozzle 50. In particular, the first stage LP nozzle 50 rises in radial elevation from the HPT 22, and is configured to efficiently channel the high swirl combustion gases directly from the HPT to the first stage LP blades 58 with reduced pressure losses.

Each of the first stage LP vanes 52 has arcuate camber and an acute second twist angle B corresponding in orientation or direction with the first twist angle A of the second stage HP blades 46. In this way, the high exit swirl from the HPT may be efficiently carried to the LP rotor blades.

Correspondingly, the first stage LP blades 58 have an acute third twist angle C oriented oppositely to the twist angle B of the first stage LP vanes 52 for effecting counterrotation of the first and second rotors 26,28. In FIG. 3, the corresponding convex suction sides of the single stage HP blades 46 face upwardly for effecting clockwise rotation of the first rotor 26 aft-looking-forward. Correspondingly, the convex suction sides of the first stage LP blade 58 face downwardly for effecting counterclockwise rotation of the second rotor 28 aft-looking-forward.

The introduction of counterrotation of the two rotors in the turbofan engine permits the first stage LP vanes 52 to aerodynamically unload or reduce their loading since less flow turning is required. The curvature and camber of the first stage LP vanes 52 may be substantially reduced over that found in a first stage LP nozzle in a turbofan engine having co-rotating rotors for the HPT and LPT.

Furthermore, the counterrotating turbines also permit a substantial reduction in turbine blade count. For example, the HP blades 46 illustrated in FIG. 3 may have a total blade count substantially reduced in the counterrotating configuration as opposed to a co-rotating configuration. And, the total vane count of the first stage LP vanes 52 may be substantially reduced in the counterrotating configuration as opposed to a corresponding co-rotating configuration.

The specific number of blades and vanes in these cooperating components is controlled by the intended thrust and efficiency requirements of the turbofan engine, but a substantial reduction of about ten percent in the number of HP blades 46 may be obtained, along with a substantial reduction of fifty percent or more in the number of first stage LP vanes 52 as well.

The reduction in number of airfoil count correspondingly decreases the complexity and weight and cost of the engine, and provides additional benefits in the engine. However, the primary benefit is an increase in aerodynamic efficiency.

Counterrotation of the LPT rotor permits a substantial increase in efficiency in the first stage LP nozzle 50, which in turn permits a corresponding increase in efficiency of the HPT 22 including the HP blades 46 thereof. Accordingly, the aerodynamic cooperation of the HPT 22 and counterrotating LPT 24 provide a synergistic increase in efficiency, while correspondingly reducing complexity and weight of the engine.

In view of the substantial radial increase in elevation between the HPT 22 and the LPT 24 illustrated in FIG. 2 and the large exit swirl of the combustion gases discharged from the single-stage HPT 22 as illustrated in FIG. 3, the first stage LP nozzle 50 plays a greater role in turbine efficiency as the combustion gases undergo considerable radial expansion. Since counterrotation operation of the LPT rotor substantially reduces the turning requirement for the first stage LP nozzle 50, the aerodynamic loading thereof is also reduced, which correspondingly permits a reduction in the axial width of the vanes 52 preferentially effected where they join the radially outer band 54.

In general, increasing the radius of the first stage LP nozzle 50 decreases swirl of the combustion gases therein, while increasing the flow area through the LP nozzle increases swirl therethrough. However, the area increased through the LP nozzle should not be excessive which would lead to flow separation and a substantial loss in turbine efficiency.

And, direct integration of the LP nozzle 50 at the discharge end of the HPT 22 without any intervening midframe struts or fairings may be used to advantage to avoid undesirable pressure losses therebetween. The efficiency of the LPT and the HPT are affected by not only the configurations of the vanes and blades therein, but the three dimensional configuration of the flowpaths between the airfoils, and between the outer and inner flow boundaries, and the radial clearances or gaps between the rotor blades and their surrounding turbine shrouds suitably supported from the surrounding engine casing.

Figure 4:
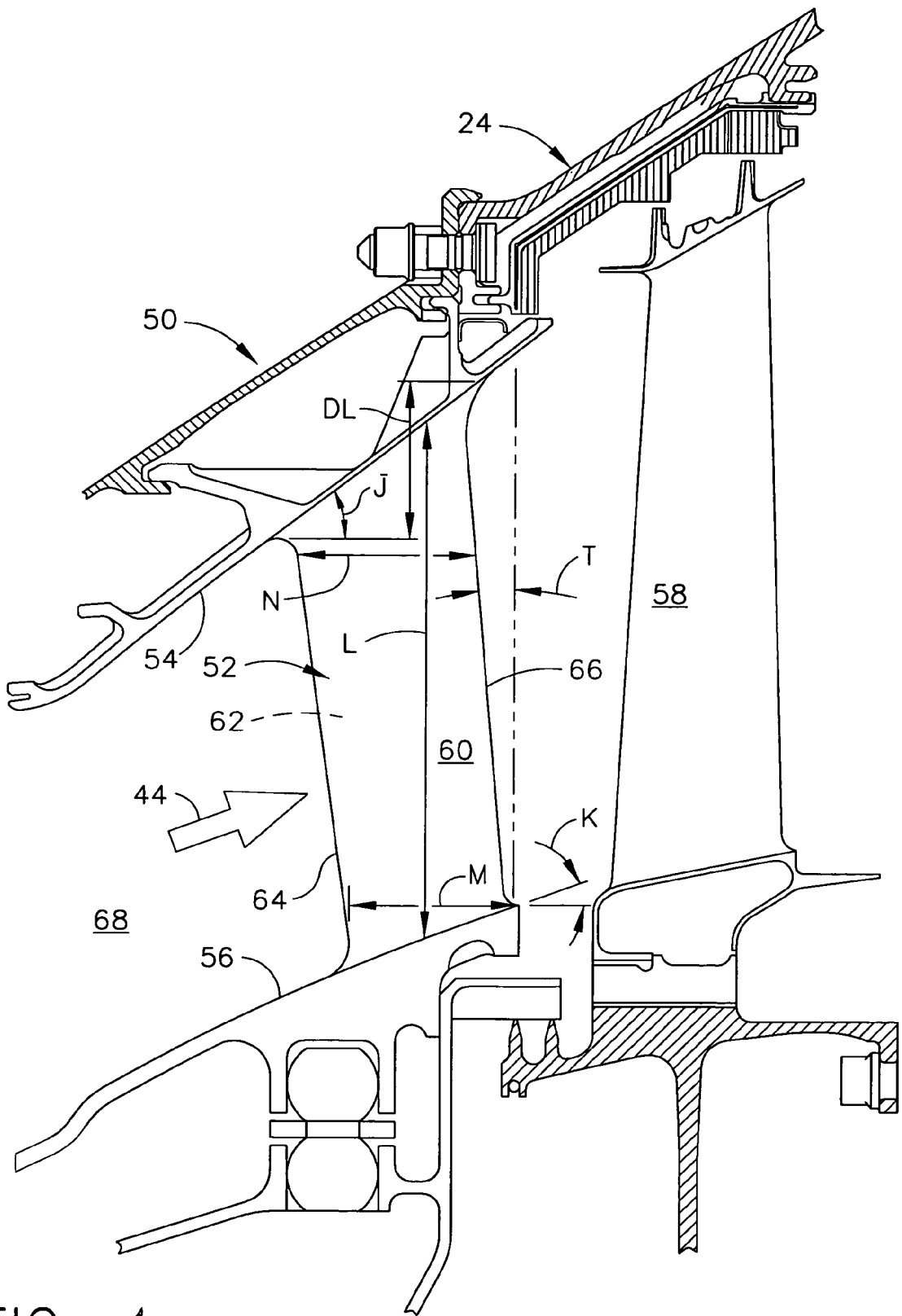
FIG. 4 is an enlarged elevational view of the first stage nozzle and rotor blades in the low pressure turbine illustrated in FIG. 2.

As illustrated in FIGS. 3 and 4, each of the vanes 52 includes a generally concave pressure side 60 and circumferentially opposite, generally convex suction side 62 extending radially in span between the bands 54,56. The two sides also extend axially in chord between opposite leading and trailing edges 64,66.

As shown in FIG. 4, the outer band 54 is inclined outwardly in the downstream direction at an acute inclination angle J. Correspondingly, the inner band 56 is also inclined radially outwardly in the downstream direction at acute inclination angle K. The inclination of the outer band is preferably greater or more than the inclination of the inner band 56 to conform with the difference in radial elevation between the HP and LP rotor blades and the requirement of the LPT to expand the combustion gases for extracting energy therefrom.

As indicated above, the swirl or turning angles of the combustion gases as they flow downstream through the flowpath is affected by the various blades, vanes, or airfoils disposed in the flowpath and by the three dimensional configuration thereof. As the flowpath increases in radius and area the combustion gases undergo expansion both axially and radially, and the absolute swirl angles of the combustion gases are simultaneously affected. In general, the higher radius of the flowpath may be used to decrease swirl, whereas an increase in flow area increases swirl, and therefore a balance must be obtained for obtaining the desired amount of swirl while maximizing aerodynamic efficiency of the turbines.

As illustrated in FIG. 3, the individual LP vanes 52 have corresponding arcuate pressure and suction sides, with a corresponding amount of arcuate camber between the leading and trailing edges thereof. The angular orientation of each vane is controlled by the acute twist angle B relative to the centerline axis 30 which is selected for maximizing cooperation with the downstream first stage rotor blades 58, and their corresponding twist angles C.

Illustrated in phantom line in FIG. 4 is a vertical or radial line representative of the typical vertical orientation of the trailing edge in a conventional first stage turbine nozzle for a co-rotating turbofan engine. The inclined bands 54,56 define the outboard boundaries of the combustion gas flowpath in the nozzle and have a divergence ratio defined by the difference in radial span or elevation designated DL between the leading and trailing edges 64,66 at the outer band 54 divided by the average radial span or length between the bands 54,56, designated L, at the various axial locations from the leading edge 64 to the trailing edge 66.

The divergence ratio has been proven by experience to be indicative of the aerodynamic efficiency of a low pressure turbine. In one exemplary conventional design of a first stage turbine nozzle with a vertical trailing edge, the divergence ratio is about 0.40. In a conventional co-rotating turbofan engine this value of divergence ratio corresponds with exceptional aerodynamic efficiency of the corresponding low pressure turbine therein.

However, attempting to simply scale the size of such a conventional first stage turbine nozzle with a vertical trailing edge results in a similar divergence ratio for use in the counterrotating turbofan engine disclosed above, except that this value of the divergence ratio results in excessive aerodynamic losses in the LPT, notwithstanding the mere size scaling of the turbine nozzle.

It has been discovered that the substantial amount of radially outward inclination of the flowpath through the first stage LP nozzle 50 enjoys the benefit of substantial radial expansion of the combustion gases, yet further improvements in the first stage LP nozzle may be introduced for further increasing the aerodynamic efficiency of not only the LPT but also the HPT as previously indicated above.

In particular, the trailing edge 66 of the vanes illustrated in FIG. 4 are inclined or tilted forwardly from the inner band 56 at an acute tilt angle T, about six degrees for example, which correspondingly effects oblique lean at the junction of the tilted trailing edge 66 and the outwardly inclined outer band 54. This simple modification of the LP nozzle illustrated in FIG. 4 permits a substantial reduction in the difference in radial span DL at the outer band 54, which correspondingly reduces the divergence ratio with the average radial span length L to a value substantially below the conventional value of about 0.4. The divergence ratio may be less than or equal to this 0.4 value in various embodiments of the nozzle for additionally increasing the aerodynamic efficiency of the LPT.

In the embodiment of the counterrotating turbofan engine illustrated in FIG. 2, the divergence ratio may be decreased to about 0.2 which represents about a fifty percent reduction in that ratio. Correspondingly, the aerodynamic efficiency of the LPT due to the tilted first stage LP nozzle 50 is increased substantially, and permits a corresponding increase in efficiency of the cooperating HPT. The tilting forward of the vane trailing edge 66 may be used to substantially decrease the axial projected width N of the vane 52 at the outer band 54 relative to the axial projected width M of the vane at the inner band 56.

Correspondingly, the vane leading edges 64 may also be tilted forward from the inner band 56 in an otherwise conventional manner, with the trailing edge tilt conforming similarly with or matching closely the leading edge tilt. For a given tilt of the leading edge 64 the forward tilting of the trailing edge 66 decreases the axial width N and correspondingly decreases the difference in radial elevation DL between the leading and trailing edges at the outer band 54, and correspondingly reduces the divergence ratio based on the average radial span or length of the vanes 52.

The forward tilted vanes 52 better complement the radially outward travel of the combustion gases 44 through the first stage LP nozzle 50 and better complement the radial expansion of the combustion gases as they flow axially between the vanes. Since the outer band 54 is inclined radially outwardly, tilting forwardly the trailing edge 66 decreases the oblique angle between the trailing edge and the outer band and complements the axial direction of the combustion gas streamlines.

The narrower vanes 52 correspondingly remove material from the nozzle and reduce engine weight. Furthermore, the forward tilted trailing edge 66 increases the spacing distance with the leading edge of the first stage LP blades 58 for reducing aerodynamic tip losses thereat as well as reducing the nozzle wake excitation of the downstream blade row.

However, the narrowing of the vanes 52 correspondingly reduces the aerodynamic loading capability of the first stage LP nozzle which must be otherwise addressed. The use of the forward tilted nozzle illustrated in FIG. 4 in a conventional co-rotating turbofan engine would require an increase in the number of vanes 52 for a given amount of aerodynamic loading. However, a net efficiency gain is possible due to the enhanced aerodynamic efficiency of the forward tilted nozzle vanes notwithstanding the increase in number of the vanes and the associated weight therefor.

In the counterrotating turbofan configuration illustrated in FIG. 2, the improved cooperation of the swirl between the HPT and LPT permits the introduction of the narrower forward tilted vanes 52 even with a reduction in vane count. Improvement in aerodynamic efficiency of the LPT as a group, as well as the increase in efficiency of the HPT, has been confirmed by computational analysis to significantly improve performance of the counterrotating turbofan engine.

In FIG. 4, the vanes 52 are clearly illustrated as being narrow or slender in axial width between the leading and trailing edges 64,66 which width is substantially less than the average radial length L of the vanes or flowpath between the outer and inner bands 54,56. The vanes and blades of the HPT and the LPT although both designed for extracting energy are nevertheless fundamentally different in size and configuration in view of their relative placement in the engine, and their respective connection to the compressor 18 which is driven at relatively high rotary speed as opposed to the fan driven at a relatively low rotary speed. The first stage LP vanes 52 are necessarily narrow for their use in the LPT and experience a substantially different flow distribution in the increasing radius at the discharge end of the HPT 22.

The axial width M of the vanes 52 at the inner band 56 may be conventionally sized for the thrust rating of the intended engine and is correspondingly narrow relative to the radial span or length L of the vanes. Correspondingly, the tilting forward of the vane trailing edges 66 substantially reduces the axial width N of the vanes near the outer band 54 creating vanes which are correspondingly narrow both at the outer and inner bands. The outer width N is substantially smaller than it would otherwise be in a conventional nozzle and may be only slightly greater than the inner width M or generally equal thereto.

The exemplary first stage nozzle 50 illustrated in FIG. 4 has an inner band 56 which terminates at an aft end closely adjacent to the vane trailing edges 66 within the small distance of the typical arcuate fillet provided thereat. Correspondingly, the outer band 54 terminates at an aft end with an axial spacing aft from the trailing edges 66, with the aft end of the outer band being vertically or radially aligned generally with the aft end of the inner band 56.

This positions the aft ends of the outer and inner bands closely adjacent to the downstream first stage LP blades 58 for maintaining continuity of the flowpath therebetween. However, the vanes 52 may be conveniently tilted forward at the outer bands 54 for providing the increase in aerodynamic efficiency as described above.

Furthermore, the outer and inner bands 54,56 of the LP nozzle 50 have corresponding forward ends which commence forwardly from the vanes 52 to define an unobstructed and integrated transition duct 68 with the HP blades 46. The duct 68 increases in radial elevation between the HP blades 46 and the vanes 52, with an unobstructed axial spacing S therebetween which is greater than about the nominal or average axial width of the vanes between the outer and inner widths N,M.

For example, the axial spacing or extension of the bands 54,56 in front of the vanes 52 may be equal to about the average radial span or length L of those narrow vanes 52. In this way, the forward extensions of the two bands 54,56 provide an unobstructed transition duct 68 between the HP blades 46 and the first stage LP vanes 52.

This unobstructed duct permits the large swirl discharge from the HPT to mix and expand prior to engaging the LP vanes, without introducing undesirable pressure losses therein. And, the gas flow from the HPT may be directly channeled through the LP nozzle without any midframe struts or fairings that complicate the design.

For example, a rear frame 70 follows the LPT 24 as shown in FIG. 2, and includes a row of struts 72 mounted between outer and inner support rings. The struts extend radially through the exhaust flowpath from the LPT.

The inner ring of the rear frame suitably supports bearings 74 that in turn support the aft ends of the first and second rotors 26,28, which in turn support the rotor blades 46,58 of the HPT 22 and LPT 24.

The turbine rotor blades 46,58 have radially outer tips which are spaced closely adjacent to surrounding turbine shrouds supported from the engine casing. The tip-to-shroud clearance or gap is maintained relatively small, about a few mils, for minimizing gas flow therethrough to increase efficiency of the turbines.

Since the LPT 24 has few stages, the first stage LP nozzle 50 may be configured without any midframe or struts therein, and small tip clearances may be maintained by mounting the rotors 26,28 from the rear frame 70, along with the increased efficiency of the integrated LP nozzle and transition duct therein.

Figure 5:
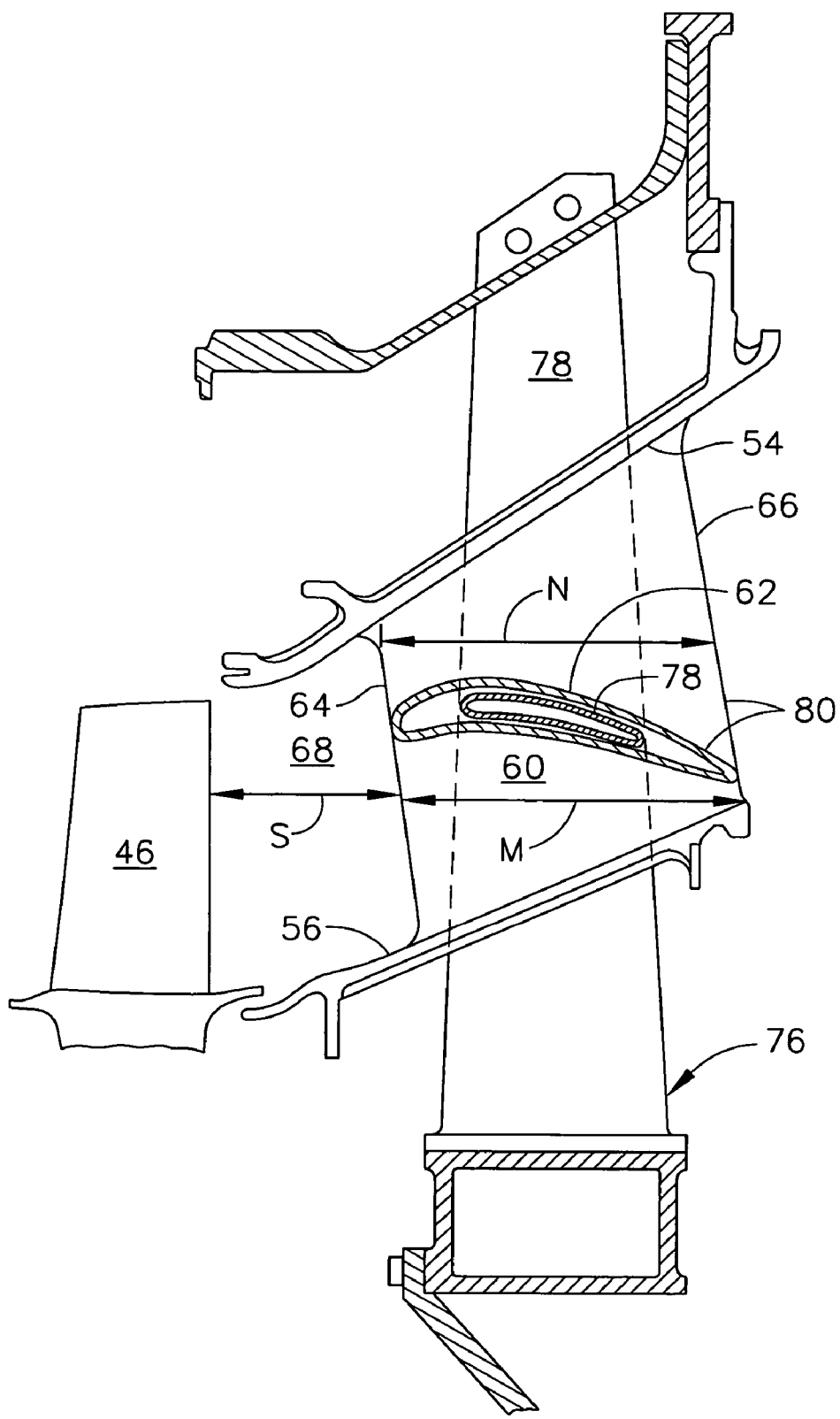
FIG. 5 is an axial sectional view, like FIG. 4, of the first stage low pressure turbine nozzle in accordance with another embodiment.

However, FIG. 5 illustrates an alternate embodiment of the first stage LP nozzle that includes a midframe 76 having a plurality of struts 78 extending through some of the first stage LP vanes, designated 80, for supporting the aft end of the first rotor 26, and in turn supporting the rotor blades 46 of the HPT 22.

In this embodiment, some of the LP vanes 80 are axially larger in width N,M between the outer and inner ends thereof, and circumferentially thicker for receiving the struts 78 extending radially therethrough. FIG. 5 illustrates a superimposed cross section of the vanes 80 and struts 78 extending therethrough, with the vanes again having arcuate camber and acute twist angle for turning the exhaust flow through the nozzle.

The integrated transition duct 68 extends axially to separate the HP blades 46 forwardly from the vanes 52 with a spacing S less than about the nominal or average axial width of the vanes 80 through which the struts 78 are mounted. However, the wider vanes 80 may alternate with the narrow vanes 52 illustrated in FIG. 4 around the circumference of the LP nozzle since typically fewer struts are required in the midframe than the number of vanes required for aerodynamic loading and turning.

Like the rear frame 70, the midframe 76 may be conventionally configured with suitable bearings to independently support the two rotors 26,28, and the rotor blades extending outwardly therefrom. Since the midframe 76 is located in this embodiment axially between the HPT and the LPT it provides support to accurately maintain the blade tip clearances of the HP blades as small as practical to increase efficiency of the HPT, and complement the efficiency gains from the integrated first stage LP nozzle 50. And, the rear frame may then be used to independently support the LP blades and the small tip clearance thereof.

In the various embodiments of the first stage LP nozzle disclosed above, the forward tilted trailing edge comes at a cost requiring a tradeoff. The tilted trailing edge reduces the effective surface area of the vanes available for turning the flow under corresponding aerodynamic loading. Accordingly, the forward tilted nozzle has best utility and best ability for increasing aerodynamic efficiency of turbines in the counterrotating turbofan engine.

In a two-spool turbofan engine, performance of the HPT and the downstream LPT are clearly interrelated as described above and affect overall performance of the engine. Counterrotation of the rotors of the HPT and the LPT permits a new configuration for the turbofan engine having increased aerodynamic efficiency.

In particular, the first stage LP nozzle significantly affects performance of the LPT, as well as performance of the HPT disposed upstream therefrom. The improvement in design of these components provides a synergistic improvement of efficiency due to the first stage LP nozzle itself, in combination with the stages of the LPT downstream therefrom, as well as in combination with the HPT disposed upstream therefrom with and without the integrated midframe therein.

This synergy also includes a significant reduction in engine weight due to the reduction in airfoil count in the turbines. And, the tilted forward first stage LP nozzle may reduce overall length of the engine, which has a further synergistic affect in reducing weight of the engine in the various other components within the juncture between the shorter first stage LP nozzle and the downstream stages of the LPT.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

Accordingly what is desired to be secured by Letters Patent of the United States is the invention as defined and differentiated in the following claims in which we claim:

1. A turbofan engine comprising:
    a fan driven by a low pressure turbine, and a compressor following said fan and driven by a single stage high pressure turbine preceding said low pressure turbine in counterrotation therewith;
    said low pressure turbine including a first stage stator nozzle directly following said high pressure turbine, and including a row of vanes disposed directly downstream following said high pressure turbine and joined at opposite ends to radially outwardly inclined outer and inner bands;
    each of said vanes having arcuate camber between leading and trailing edges thereof, and an acute twist angle for imparting swirl in combustion gases channeled between said high pressure turbine and said low pressure turbine; and
    said trailing edges being tilted forward from said inner band with oblique lean at said outer band.

2. An engine according to claim 1 wherein said outer and inner bands extend forwardly from said vanes to define an unobstructed and integrated transition duct increasing in radial elevation between rotor blades in said high pressure turbine and said vanes.

3. An engine according to claim 2 wherein said inclined bands have a divergence ratio defined by the difference in radial span between said leading and trailing edges at said outer band divided by the average radial span between said bands from said leading edge to said trailing edge, with said ratio being less than about 0.4.

4. An engine according to claim 3 wherein:
said vane trailing edges are tilted forwardly from said inner band with oblique lean at said outer band; and
said vane leading edges are also tilted forwardly from said inner band, and said trailing edge tilt conforms with said leading edge tilt.

5. An engine according to claim 4 wherein said outer band is inclined more than said inner band.

6. An engine according to claim 5 wherein said vanes are narrow in axial width between said leading and trailing edges with said width being less than the radial length between said outer and inner bands.

7. An engine according to claim 6 wherein said vanes are correspondingly narrow at both said outer and inner bands.

8. An engine according to claim 7 wherein said transition duct extends axially to separate said blades forwardly from said vanes with a spacing greater than about a nominal width of said vanes.

9. An engine according to claim 7 further comprising a rear frame following said low pressure turbine and including bearings supporting aft ends of a first rotor supporting said rotor blades of said high pressure turbine, and a second rotor supporting rotor blades in said low pressure turbine.

10. An engine according to claim 7 further comprising a midframe including a plurality of struts extending through said first stage vanes for supporting the aft end of a first rotor, and in turn supporting said rotor blades of said high pressure turbine.

11. A turbofan engine comprising:
a fan, compressor, combustor, high pressure (HP) turbine (HPT), and multistage low pressure (LP) turbine (LPT) joined in serial flow communication for sequentially pressurizing air in said fan and compressor to generate combustion gases in said combustor from which energy is extracted in said HPT and LPT;
said compressor being joined to said HPT by a first rotor, and said fan being joined to said LPT by a second rotor;
said HPT including a single stage of HP rotor blades therein joined to said first rotor, with said HP blades having an acute twist angle to effect a corresponding acute angle exit swirl in said combustion gases discharged therefrom;
said LPT including a first stage LP nozzle directly following said HP blades and having a row of first stage LP vanes disposed directly downstream following said HP blades and extending radially in span between outer and inner bands, and followed in turn by a row of first stage LP blades joined to said second rotor;
each of said vanes having a concave pressure side and circumferentially opposite, convex suction side extending radially in span between said bands and axially in chord between opposite leading and trailing edges;
said bands being inclined outwardly between said leading and trailing edges, with said vanes having camber for turning combustion gases between said leading and trailing edges, and also having an acute twist angle for imparting swirl in said combustion gases discharged at said trailing edges; and
said LP blades being oriented oppositely to said HP blades for counterrotating said first and second rotors.

12. An engine according to claim 11 wherein said outer and inner bands extend forwardly from said vanes to define an unobstructed and integrated transition duct increasing in radial elevation between said HP blades and said vanes.

13. An engine according to claim 12 wherein said outer band is inclined more than said inner band.

14. An engine according to claim 13 wherein said vanes are narrow in axial width between said leading and trailing edges with said width being less than the radial length between said outer and inner bands.

15. An engine according to claim 14 wherein said vanes are correspondingly narrow at both said outer and inner bands.

16. An engine according to claim 15 wherein:
said vane trailing edges are tilted forwardly from said inner band with oblique lean at said outer band; and
said vane leading edges are also tilted forwardly from said inner band, and said trailing edge tilt conforms with said leading edge tilt.

17. An engine according to claim 16 wherein said inclined bands have a divergence ratio defined by the difference in radial span between said leading and trailing edges at said outer band divided by the average radial span between said bands from said leading edge to said trailing edge, with said ratio being less than about 0.4.

18. An engine according to claim 17 wherein said divergence ratio is about 0.2.

19. An engine according to claim 17 wherein said inner band terminates adjacent to said vane trailing edges, and said outer band terminates with a spacing aft from said trailing edges vertically aligned with said inner band.

20. An engine according to claim 17 wherein said transition duct extends axially to separate said HP blades forwardly from said vanes with a spacing less than about the nominal width of said vanes.

21. An engine according to claim 17 wherein said transition duct extends axially to separate said HP blades forwardly from said vanes with a spacing greater than about the nominal width of said vanes.

22. An engine according to claim 17 wherein said transition duct extends axially to separate said HP blades forwardly from said vanes with a spacing equal to about the average radial span of said vanes.

23. An engine according to claim 17 further comprising a rear frame following said LPT and including bearings supporting aft ends of said first and second rotors, and in turn supporting said rotor blades of said HPT and LPT.

24. An engine according to claim 17 further comprising a midframe including a plurality of struts extending through said first stage LP vanes for supporting the aft end of said first rotor, and in turn supporting said rotor blades of said HPT.

* * * * *